US012315466B2

United States Patent
Enriquez Ortiz

(10) Patent No.: US 12,315,466 B2
(45) Date of Patent: May 27, 2025

(54) FRONT-LIT USER INTERFACE

(71) Applicant: JoysonQuin Automotive Systems North America, LLC, Troy, MI (US)

(72) Inventor: Mario J. Enriquez Ortiz, Holland, MI (US)

(73) Assignee: JoysonQuin Automotive Systems North America, LLC, Troy, MI (US)

( * ) Notice: Subject to any disclaimer, the term of this patent is extended or adjusted under 35 U.S.C. 154(b) by 0 days.

(21) Appl. No.: 18/435,854

(22) Filed: Feb. 7, 2024

(65) Prior Publication Data

US 2024/0363080 A1    Oct. 31, 2024

Related U.S. Application Data

(60) Provisional application No. 63/498,358, filed on Apr. 26, 2023.

(51) Int. Cl.
*G09G 3/34*     (2006.01)
*G06F 3/041*    (2006.01)
*G06F 3/044*    (2006.01)

(52) U.S. Cl.
CPC ......... *G09G 3/3406* (2013.01); *G06F 3/0414* (2013.01); *G06F 3/044* (2013.01); *G09G 2320/0626* (2013.01)

(58) Field of Classification Search
None
See application file for complete search history.

(56) References Cited

U.S. PATENT DOCUMENTS

| | | |
|---|---|---|
| 8,785,311 B2 | 7/2014 | Miyoshi et al. |
| 10,061,434 B2 | 8/2018 | Nathan et al. |
| 10,126,807 B2 | 11/2018 | Nathan et al. |
| 10,254,894 B2 | 4/2019 | Nathan et al. |
| 10,282,046 B2 | 5/2019 | Nathan et al. |
| 10,289,247 B2 | 5/2019 | Nathan et al. |
| 10,310,659 B2 | 6/2019 | Nathan et al. |
| 10,318,038 B2 | 6/2019 | Nathan et al. |
| 10,430,009 B2 | 10/2019 | Nathan et al. |
| 10,496,210 B2 | 12/2019 | Nathan et al. |
| 10,599,268 B2 | 3/2020 | Nathan et al. |
| 10,691,208 B2 | 6/2020 | Toma et al. |
| 10,739,926 B2 | 8/2020 | Nathan et al. |
| 10,817,116 B2 | 10/2020 | Bagheri et al. |
| 10,852,875 B2 | 12/2020 | Routley et al. |

(Continued)

OTHER PUBLICATIONS

Extended European Search Report for European Patent Application No. 24166957.1 dated Sep. 23, 2024, 9 pages.

*Primary Examiner* — Christopher J Kohlman
(74) *Attorney, Agent, or Firm* — Duane Morris LLP

(57) ABSTRACT

A method for operating an electronic display includes illuminating, by a first light source, a first optical layer such that decorative content is lit or rendered visible to a user through a touch screen of the electronic display, wherein the touch screen comprises a second optical layer and a touch sensing layer; illuminating, by a second light source, the second optical layer such that at least one first graphical user interface icon is visible to the user of the electronic display; and detecting, by a circuit, a touch by the user in an area of the touch sensing layer that corresponds to an area of the second optical layer comprising the at least one first graphical user interface icon.

12 Claims, 8 Drawing Sheets

(56) References Cited

U.S. PATENT DOCUMENTS

| | | |
|---|---|---|
| 10,928,947 B2 | 2/2021 | Micci et al. |
| 10,928,950 B2 | 2/2021 | Nathan et al. |
| 11,009,646 B2 | 5/2021 | Nichol et al. |
| 11,037,694 B2 | 6/2021 | Hu et al. |
| 11,093,088 B2 | 8/2021 | Bagheri et al. |
| 11,111,396 B2 | 9/2021 | Yang et al. |
| 11,221,703 B2 | 1/2022 | Routley et al. |
| 11,231,801 B2 | 1/2022 | Routley et al. |
| 11,237,667 B2 | 2/2022 | Nathan et al. |
| 11,249,575 B2 | 2/2022 | Micci et al. |
| 11,256,025 B2 | 2/2022 | Nichol et al. |
| 11,274,223 B2 | 3/2022 | Yang et al. |
| 11,275,204 B2 | 3/2022 | Nichol et al. |
| 11,294,492 B2 | 4/2022 | Micci et al. |
| 11,343,911 B1 | 5/2022 | Kambe et al. |
| 11,353,980 B2 | 6/2022 | Astley et al. |
| 11,429,240 B2 | 8/2022 | Tsangarides et al. |
| 11,442,213 B2 | 9/2022 | Nichol et al. |
| 11,474,653 B2 | 10/2022 | Ferreira Marques et al. |
| 11,481,060 B2 | 10/2022 | Bagheri |
| 11,494,022 B2 | 11/2022 | Astley et al. |
| 11,498,129 B2 | 11/2022 | Hu et al. |
| 11,512,215 B2 | 11/2022 | Li et al. |
| 11,513,274 B2 | 11/2022 | Nichol et al. |
| 2012/0064708 A1 | 3/2012 | Miyoshi et al. |
| 2012/0164328 A1 | 6/2012 | Kojima et al. |
| 2012/0171365 A1 | 7/2012 | Azumo et al. |
| 2012/0211890 A1 | 8/2012 | Azumo et al. |
| 2012/0220121 A1 | 8/2012 | Azumo et al. |
| 2013/0265256 A1 | 10/2013 | Nathan et al. |
| 2014/0008203 A1 | 1/2014 | Nathan et al. |
| 2016/0179276 A1 | 6/2016 | Nathan et al. |
| 2016/0325674 A1* | 11/2016 | Krull ................. B60Q 3/64 |
| 2017/0139527 A1 | 5/2017 | Nathan et al. |
| 2017/0199624 A1 | 7/2017 | Nathan et al. |
| 2017/0228096 A1 | 8/2017 | Nathan et al. |
| 2017/0262099 A1 | 9/2017 | Nathan et al. |
| 2017/0359064 A1 | 12/2017 | Nathan et al. |
| 2017/0364193 A9 | 12/2017 | Nathan et al. |
| 2017/0371470 A1 | 12/2017 | Nathan et al. |
| 2018/0143725 A1 | 5/2018 | Nathan et al. |
| 2018/0224994 A1 | 8/2018 | Nathan et al. |
| 2018/0335846 A1 | 11/2018 | Toma et al. |
| 2019/0050080 A1 | 2/2019 | Bagheri et al. |
| 2019/0212846 A1 | 7/2019 | Nathan et al. |
| 2019/0212874 A1 | 7/2019 | Nathan et al. |
| 2019/0227649 A1 | 7/2019 | Micci et al. |
| 2019/0243502 A1 | 8/2019 | Nathan et al. |
| 2019/0243503 A1 | 8/2019 | Nathan et al. |
| 2019/0253053 A1 | 8/2019 | Nathan et al. |
| 2019/0286263 A1 | 9/2019 | Bagheri et al. |
| 2019/0361547 A1 | 11/2019 | Nathan et al. |
| 2019/0377452 A1 | 12/2019 | Routley et al. |
| 2019/0377468 A1 | 12/2019 | Micci et al. |
| 2019/0377469 A1 | 12/2019 | Routley et al. |
| 2020/0139814 A1 | 5/2020 | Galan Garcia et al. |
| 2020/0207207 A1 | 7/2020 | Lesuffleur et al. |
| 2020/0293132 A1 | 9/2020 | Nathan et al. |
| 2020/0356207 A1 | 11/2020 | Routley et al. |
| 2020/0369223 A1* | 11/2020 | Hansen ............... B60R 11/0229 |
| 2021/0011574 A1 | 1/2021 | Micci et al. |
| 2021/0055832 A1 | 2/2021 | Bagheri |
| 2021/0124458 A1 | 4/2021 | Marques et al. |
| 2021/0141507 A1 | 5/2021 | Micci et al. |
| 2021/0165550 A1 | 6/2021 | Astley et al. |
| 2021/0181405 A1 | 6/2021 | Nichol et al. |
| 2021/0232257 A1 | 7/2021 | Routley et al. |
| 2021/0263633 A1 | 8/2021 | Astley et al. |
| 2021/0265073 A1 | 8/2021 | Hu et al. |
| 2021/0278585 A1 | 9/2021 | Nichol et al. |
| 2021/0294021 A1 | 9/2021 | Romero et al. |
| 2021/0333629 A1 | 10/2021 | Nichol et al. |
| 2021/0337173 A1 | 10/2021 | Nichol et al. |
| 2021/0340386 A1 | 11/2021 | Yang et al. |
| 2021/0373698 A1 | 12/2021 | Astley et al. |
| 2022/0033601 A1 | 2/2022 | Manzour et al. |
| 2022/0132672 A1 | 4/2022 | Yang et al. |
| 2022/0137767 A1 | 5/2022 | Astley et al. |
| 2022/0147187 A1 | 5/2022 | Tsangarides et al. |
| 2022/0154025 A1 | 5/2022 | Yang et al. |
| 2022/0164056 A1 | 5/2022 | Micci et al. |
| 2022/0171489 A1 | 6/2022 | Nathan et al. |
| 2022/0179148 A1 | 6/2022 | Coleman et al. |
| 2022/0196903 A1 | 6/2022 | Nichol et al. |
| 2022/0256694 A1 | 8/2022 | Kambe et al. |
| 2022/0268984 A1 | 8/2022 | Nichol et al. |
| 2022/0374097 A1 | 11/2022 | Astley et al. |
| 2023/0011530 A1 | 1/2023 | Nichol et al. |
| 2023/0080279 A1 | 3/2023 | Li et al. |
| 2023/0099260 A1 | 3/2023 | Nichol et al. |

* cited by examiner

FRONT-LIT USER INTERFACE

CROSS REFERENCE TO RELATED APPLICATION

This application claims the benefit of U.S. Provisional Patent Application No. 63/498,358, filed Apr. 26, 2023, which is hereby incorporated by reference for all purposes as if fully set forth herein.

BACKGROUND

The integration of computing devices with everyday items has become increasingly common. Mobile computing devices such as smartphones and electronic tablets are ubiquitous, and computing devices are commonly integrated into kitchen appliances, vehicles, and even furniture. To facilitate user interaction with the computing devices, the appliances, vehicles, or other items into which the computing devices are integrated must have a user interface such as a display. The display is typically visible on the surface of the item, even when the computing device is turned off. This can detract from aesthetics of the item.

SUMMARY

To overcome the problems described above, embodiments of the present disclosure provide a display comprising a stack of material layers including a decorative layer configured to provide visually appealing content when the display is not in use and methods of operating such displays.

In an embodiment, a method for operating an electronic display includes illuminating, by a first light source, a first optical layer such that decorative content is lit or rendered visible to a user through a touch screen of the electronic display, wherein the touch screen comprises a second optical layer and a touch sensing layer; illuminating, by a second light source, the second optical layer such that at least one first graphical user interface icon is visible to the user of the electronic display; and detecting, by a circuit, a touch by the user in an area of the touch sensing layer that corresponds to an area of the second optical layer comprising the at least one first graphical user interface icon.

The method can further include reducing or discontinuing illumination of the first optical layer prior to illuminating the second optical layer.

The method can further include using another layer to prevent light from bleeding from the first optical layer to the second optical layer or from the second optical layer to the first optical layer.

In an aspect the decorative content comprises a veneer panel located below the first optical layer in a stack of layers.

The method can further include using the first optical layer to uniformly or non-uniformly light a front surface of the veneer panel.

In an aspect, the decorative content comprises first lighting content.

The method can further include illuminating, by a third light source, a third optical layer such that second different lighting content is rendered visible to a user through a touch screen of the electronic display.

In an aspect, the first lighting content and the second lighting content have different colors.

In an aspect, the first lighting content and the second lighting content have different perceived depths to the user.

The method can further include illuminating, by a fourth light source, a fourth optical layer such that at least one second graphical user icon is visible to the user of the electronic display prior to, subsequent to, or along with visibility of the at least one first graphical user icon.

In an aspect, the at least one first graphical user icon and the at least one second graphical user icon have different colors.

In an aspect, the at least one first graphical user icon and the at least one second graphical user icon have different perceived depths to the user.

The method can further include sensing, by at least one pressure sensor of the circuit, an amount of pressure being applied by the user to the touch screen.

The method can further include causing, by the circuit, haptic feedback to be provided to the user responsive to said sensing by the pressure sensor.

In an aspect, the touch sensing layer comprises a capacitive and pressure sensing film.

The method can further include detecting, by the touch sensing layer, an amount of pressure being applied by the user to the touch screen.

The method can further include causing, by the circuit, haptic feedback to be provided to the user responsive to said pressure sensed by the touch sensing layer.

The method can further include controlling operations of an electronic device or a vehicle responsive to said touch.

In another embodiment, an electronic display includes a first optical layer; a touch screen comprising a second optical layer and a touch sensing layer; a first light source configured to illuminate the first optical layer such that decorative content is lit or rendered visible to a user through the touch screen; a second light source configured to illuminate the second optical layer such that at least one first graphical user interface icon is visible to the user; and a circuit configured to detect a touch by the user in an area of the touch sensing layer that corresponds to an area of the second optical layer comprising the at least one first graphical user interface icon.

In an aspect, the circuit is further configured to cause illumination of the first optical layer to be reduced or discontinued prior to illumination of the second optical layer.

The electronic display can further include another layer configured to prevent light from bleeding from the first optical layer to the second optical layer or from the second optical layer to the first optical layer.

In an aspect, the decorative content comprises a veneer panel located below the first optical layer in a stack of layers.

In an aspect, a front surface of the veneer panel is uniformly or non-uniformly light lit by the first optical layer.

In an aspect, the decorative content comprises first lighting content.

The electronic display can further include a third light source configured to illuminate a third optical layer such that second different lighting content is rendered visible to the user through the touch screen.

In an aspect, the first lighting content and the second lighting content have different colors.

In an aspect, the first lighting content and the second lighting content have different perceived depths to the user.

The electronic display can further include a fourth light source configured to illuminate a fourth optical layer such that at least one second graphical user icon is visible to the user of the electronic display prior to, subsequent to, or along with visibility of at least one first graphical user icon.

In an aspect, the at least one first graphical user icon and the at least one second graphical user icon have different colors.

In an aspect, the at least one first graphical user icon and the at least one second graphical user icon have different perceived depths to the user.

The electronic display can further include at least one pressure sensor configured to sense an amount of pressure being applied by the user to the touch screen.

In an aspect, the circuit is further configured to cause haptic feedback to be provided to the user responsive to said sensing by the pressure sensor.

In an aspect, the touch sensing layer comprises a capacitive and pressure sensing film.

In an aspect, the touch sensing layer is configured to sense an amount of pressure being applied by the user to the touch screen.

In an aspect, the circuit is further configured to cause haptic feedback to be provided to the user responsive to said pressure sensed by the touch sensing layer.

In an aspect, the circuit is further configured to control operations of an electronic device or a vehicle responsive to said touch.

In another embodiment, a non-transitory computer-readable medium includes executable instructions that when executed by a processor cause the processor to perform: illuminating, by a first light source, a first optical layer such that decorative content is lit or rendered visible to a user through a touch screen of the electronic display, wherein the touch screen comprises a second optical layer and a touch sensing layer; illuminating, by a second light source, the second optical layer such that at least one first graphical user interface icon is visible to the user of the electronic display; and detecting, by a circuit, a touch by the user in an area of the touch sensing layer that corresponds to an area of the second optical layer comprising the at least one first graphical user interface icon.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", "above" and "below", "over" or "under", or "front" and "behind," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1A:
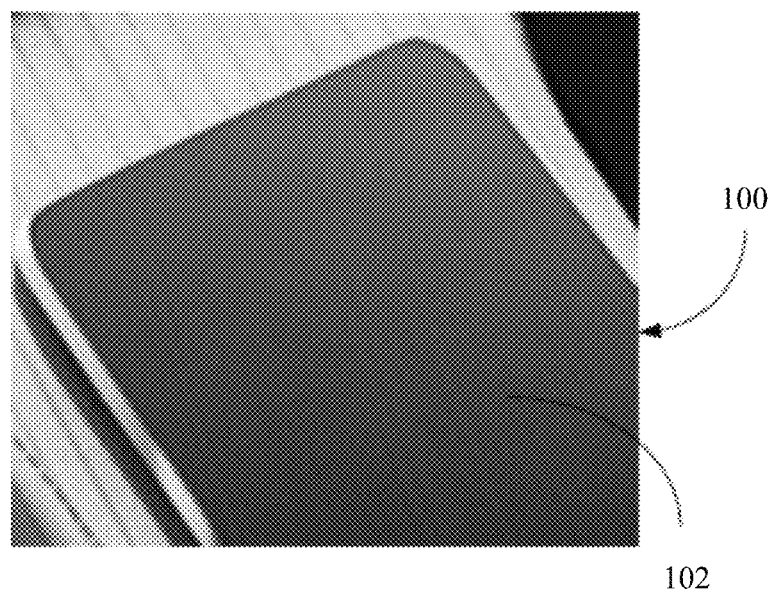
FIG. 1A and FIG. 1B (collectively referred to herein as "FIG. 1") illustrate one example of an electronic device in accordance with some embodiments.
Figure 1B:
Figure 7:
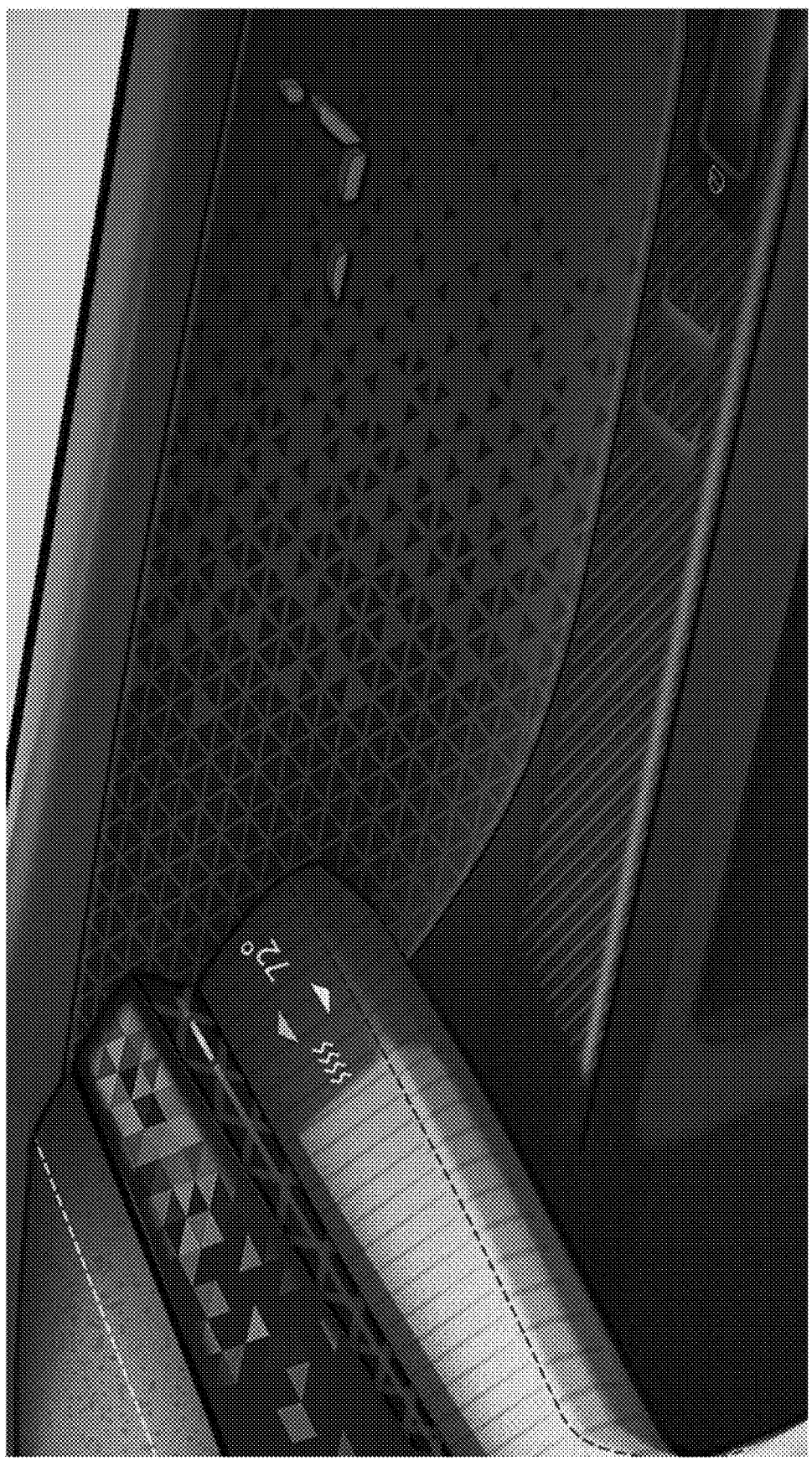
FIG. 7 provides illustrates one example of the display being used in a vehicle dashboard and door in accordance with some embodiments.

FIGS. 1A-1B illustrate an electronic device 100. The electronic device 100 is shown to be a smart phone. The present solution is not limited in this regard. The electronic device 100 can alternatively include a laptop computer, a tablet computing device, or simply a user interface that is integrated into another item (e.g., a vehicle interior panel, an appliance, an item of furniture, or a book). Electronic devices also may include home appliances and/or vehicle control systems (as shown in FIG. 7).

The electronic device 100 may include a display 102 in accordance with the present disclosure.

The display 102 may include a stack of material layers. The stack 200 may include the following layers shown in FIG. 2: a decorative layer 202 configured to provide visually appealing content (other than a widget) when the display 102 is not in use (e.g., turned OFF, disabled, or in a low power save mode); an icon layer 204 configured to display text, numbers and/or graphical widget icons 104 to facilitate operation of the touch screen; a capacitance and/or pressure sensing layer 206 to facilitate user-software interactions by touching on the screen and/or to facilitate haptic feedback (e.g., tactile, auditory and/or visual); and a protective layer 208 to protect layer 206 from damage. Layer 206 can include, but is not limited to, a multi-touch material (e.g., a transparent nanowire material which is available from C3Nano of Hayward, California), or a multi-touch and force sensing material (e.g., a material available from Cambridge Touch Technologies of Cambridge, United Kingdom). Layer 208 can include, but is not limited to, a glass panel, a polyurethane (PUR) coating, and/or a translucent nylon film.

Figure 2:
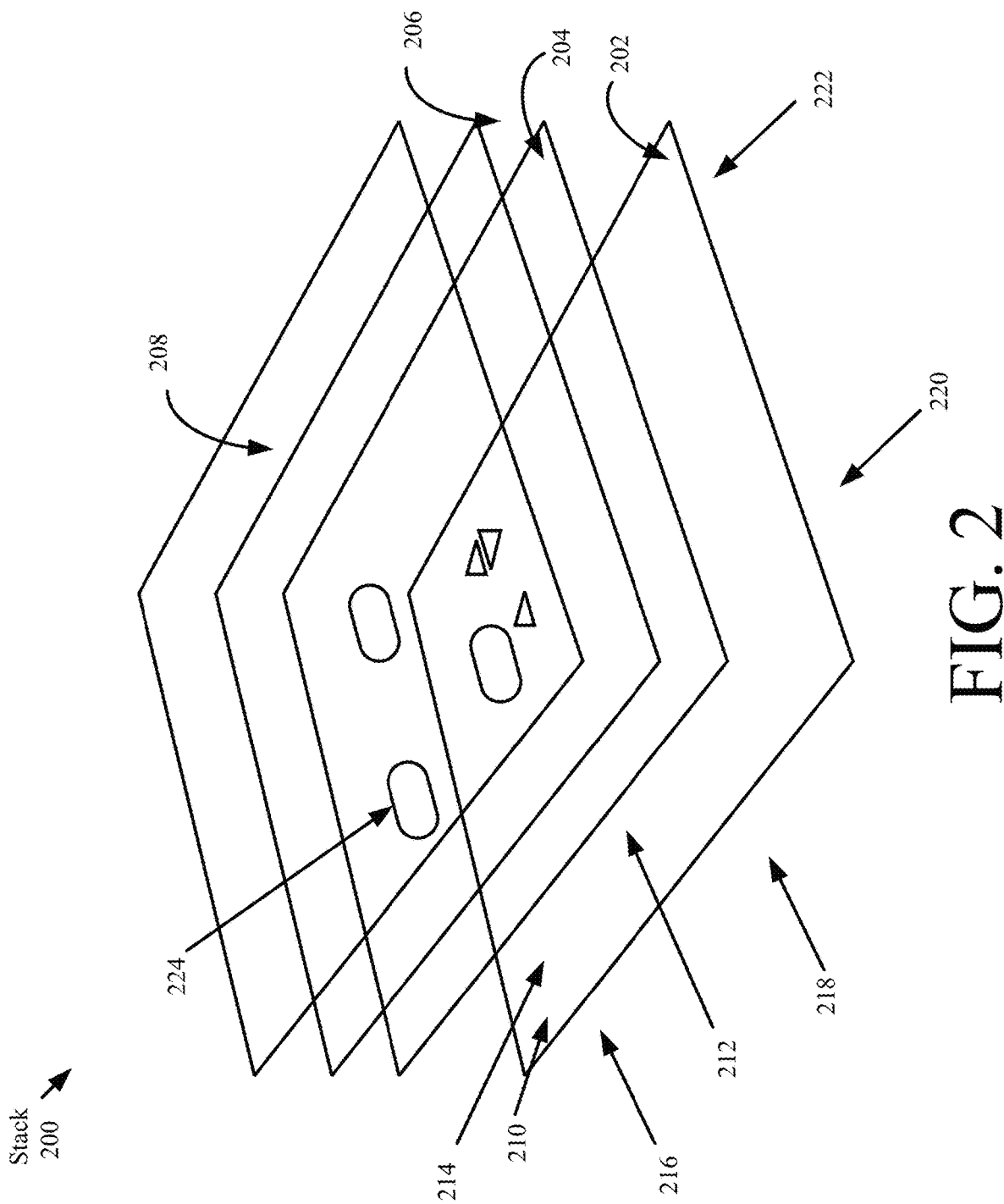
FIG. 2 shows one example of a display stack for an electronic device in accordance with some embodiments.

Layer 202 comprises a vencer panel. The vencer panel can include, but is not limited to: actual wood; carbon fiber; metal (e.g., aluminum); a cellulosic material (e.g., paper or cardboard); a substrate with a coating (e.g., paint or polymer) to simulate a pattern; and/or other naturally existing material(s) (e.g., stone or shell). The simulated pattern can include, but is not limited to, a pattern found in nature (e.g., a woodgrain pattern as shown in FIG. 2, a marble pattern, a stone pattern, and/or a shell pattern), and/or another visible regularity of structure or shape in which some areas of the panel exhibit a relatively darker shading than other areas of the panel that exhibit a relatively lighter shading. The vencer panel may have a thickness that is in a range that is from a lower end of approximately 0.05 micron, approximately 0.1 micron, or approximately 1 micron to an upper end of approximately 0.5 mm, approximately 1.0 mm, or approximately 2.0 mm. In some embodiments, the thickness may be approximately 0.2 mm. Other thicknesses are possible.

Layer 202 may be provided with a top illumination layer to light the below vencer panel from the front. The front lighting can be uniform or non-uniform across layer 202. In the uniform scenario, the entire top (or front) surface 210 of layer 202 is lit by the same amount. In the non-uniform scenarios, portions of the top surface of layer 202 are lit by the same or different amounts. For example, a center portion 212 of layer 202 could be lit brighter than the edge portion 214 of the layer 202, or vice versa. The first half 216, 220 of layer 202 could be lit brighter than a second half 218, 222 of the layer 202, or vice versa. The left side portion 220 of layer 202 could be lit brighter than the right side portion 222 of the layer 202, or vice versa. Any other lighting scheme for varying light intensity on layer 202 can be employed without limitation. The top illumination layer can include, but is not limited to, an edge-lit panel configured to direct light uniformly or selectively across its surface. In FIGS. 1A-1B, the top illumination layer is turned OFF or otherwise disabled such that the vencer panel is not lit. Since layers 204-208 are transparent, the simulated pattern of the vencer panel is visible through these layers.

Icon layer 204 is configured to display text, numbers and/or graphical widget icons 104 to facilitate operation of the touch screen. The graphical widget icons 104 can include, but are not limited to, a virtual button icon, a sliding bar icon, and/or other graphical user interface (GUI) widget(s). Layer 204 can include, but is not limited to, an edge-lit panel configured to direct light uniformly or selectively across its surface. The icons 104 are not visible when the lightguide panel is not being lit by a light source as shown in FIG. 1A and are visible when the lightguide panel is being lit by the light source as shown in FIG. 1B.

Display 102 can include one or more additional layers than those shown in FIG. 2. Thus, other illustrative display stacks will now be discussed in relation to FIGS. 3-6.

Figure 3:
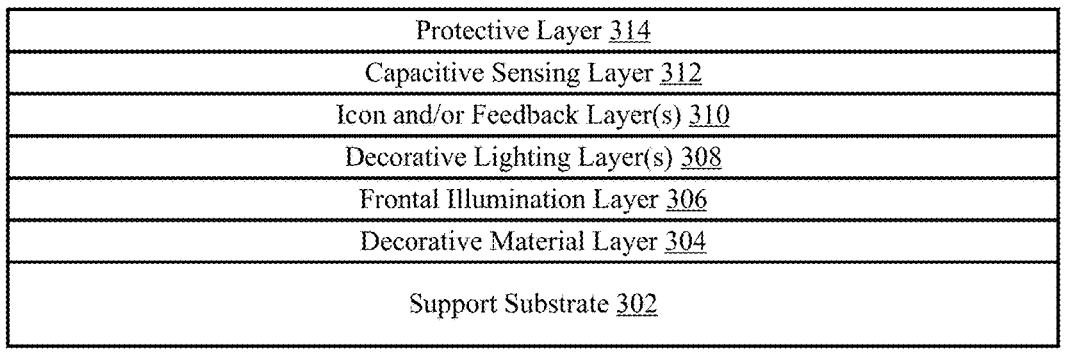
FIG. 3, FIG. 5, and FIG. 6 show other examples of display stacks for an electronic device in accordance with some embodiments.

With reference to FIG. 3, a display stack 300 comprises a support substrate 302 formed of a rigid material. Other layers 304-314 of the display stack 300 are structurally supported by substrate 302. The rigid material can include, but is not limited to, plastic and/or other material. The other layers comprise a decorative material layer 304, a frontal illumination layer 306, decorative lighting layer(s) 308, icon layer(s) 310, a capacitive sensing layer 312, and a protective layer 314. The decorative material layer 304 and the support substrate 302 may be formed of a transparent material, an opaque material and/or a non-transparent material.

Layers 304, 306 may collectively be the same as or substantially similar to decorative layer 202 of FIG. 2. Layers 310, 312, 314 may be the same as or substantially similar to respective layers 204, 206, 208 of FIG. 2. However, any number of icon layers can be provided in accordance with an display application. Two or more icon layers could provide: certain icons with a first visual depth (e.g., icons appear relatively close to user) and other icons with a second different visual depth (e.g., icons appear farther away from user); certain icons with a first brightness and/or color, and other icons with a second different brightness and/or color; and/or be illuminated at the same time thus providing different functionalities in different states.

Decorative lighting layer(s) 308 may be similar to icon layer(s) 310 but configured to present decorative content rather than GUI widget content. In various embodiments, decorative content may be considered to be background content, and the GUI widgets may be considered to be foreground content, so that the GUI widgets are displayed on top of and/or with priority over background content. The decorative content can include, but is not limited to, company logos, slogans, static artwork, and/or moving objects. In the moving object scenarios, two or more layers can be turned ON (or otherwise enabled or illuminated) and OFF (or otherwise disabled or no longer illuminated) in a sequential manner such that the object's position changes on the display screen. For example, four decorative lighting layers 308 are provided and configured to present a ball bouncing from the left side of the screen to the right side of screen. The present solution is not limited to the particulars of this example. Each decorative lighting layer can include, but is not limited to, an edge-lit panel configured to direct light uniformly or selectively across its surface.

Figure 4:
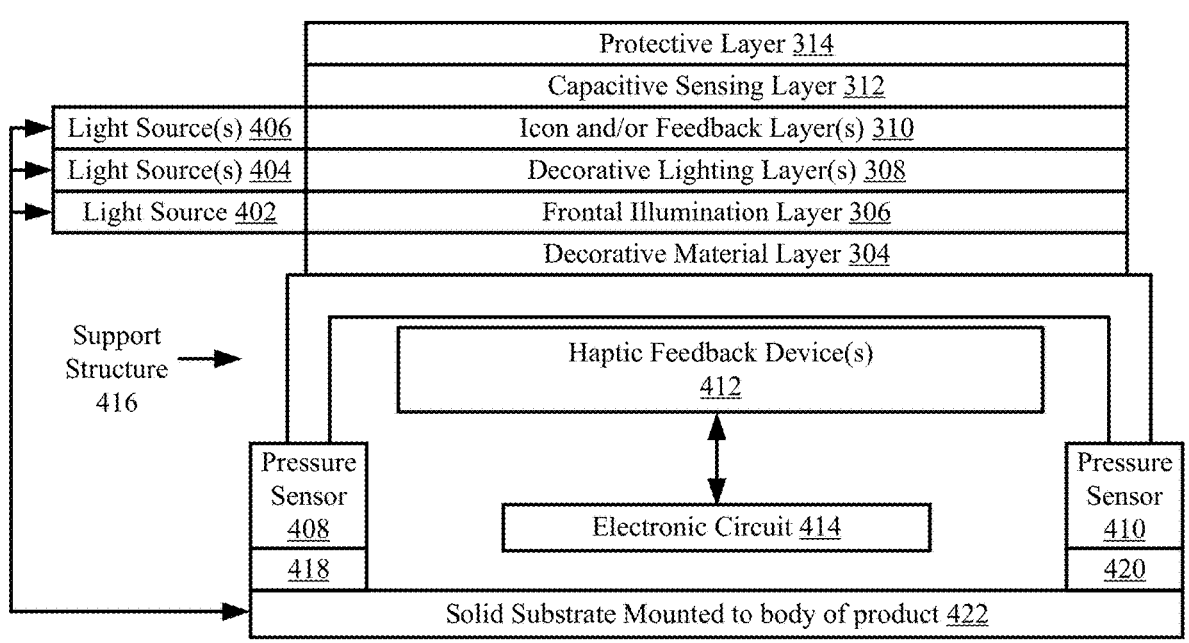
FIG. 4 provides one example of a display in accordance with some embodiments.

An illustrative display 400 implementing the display stack 300 is shown in FIG. 4. In the display 400, a planar support structure 302 has been replaced with a non-planar support structure 416. The shape of support structure 416 has been selected to accommodate pressure sensors 408, 410 and haptic feedback device(s) 412. The pressure sensors 408, 410 are coupled to support structure 418, 420 via flexible mounts (e.g., rubber, metal springs, and/or other flexible material) to allow the display stack 400 to move up and down a certain distance (e.g., a few microns). The pressure sensors 408, 410 are configured to detect how hard a person is pressing on the display 400. In this way, the display 400 can work with fingers with or without a covering (e.g., a non-gloved or gloved hand). The pressure sensors 408, 410 are in communication with an electronic circuit 414. The electronic circuit 414 may be mounted on substrate 422 or the support structure 416. The electronic circuit 414 is configured to trigger a capacitive touch when the user actually touches the display 400 (and not when the user is in proximity to the display 400). This pressure-based capacitive touch triggering can reduce or eliminate false detections and/or alarms.

When a capacitive touch is triggered, the electronic circuit 414 controls the haptic feedback device(s) 412 to generate tactile output(s) (e.g., vibration) and/or auditory output(s) (e.g., a ping or other sound). The same haptic feedback can be output in response to each capacitive touch trigger, or alternatively different types of haptic feedback can be output based on the amount of pressure detected by the pressure sensor. For example, a first type of haptic feedback (e.g., an auditory sound) is output when a first amount of pressure is detected, and a second type of haptic feedback (e.g., a vibration) is output when a second lesser amount of pressure is detected. The present solution is not limited to the particulars of this example.

The electronic circuit 414 is also configured to control light sources 402, 404, 406. Light sources can include, but are not limited to, light emitting diodes (LEDs). Light source 402 is provided to facilitate the selective illumination of the decorative material layer 304 from the front. Light source(s) 404 is (are) provided to facilitate the selective illumination of decorating light layer(s) 308. Light source(s) 406 are provided to facilitate the selective illumination of icon layer(s) 310. Light sources 402, 404, 406 can emit light of the same or different colors. For example, all light sources may be configured to emit the same color of light (e.g., white light) in some scenarios or different colors of light in other scenarios (e.g., white, green, blue, and/or red). The light emitted from the light sources can have the same or different intensities. When a layer is illuminated by the respective light source, the content thereof is visible to the user. Otherwise, the content is not visible to the user.

Figure 5:
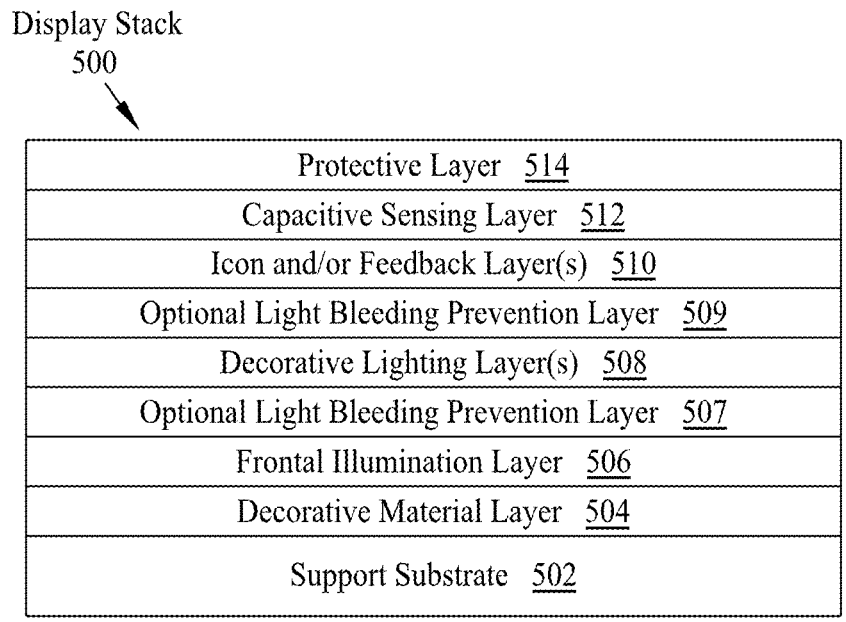

Another illustrative display stack 500 that can be implemented in a display of the present disclosure is shown in FIG. 5. Similar to the display stack 300, the display stack 500 comprises a support substrate 502, a decorative material layer 504, a frontal illumination layer 506, decorative lighting layer(s) 508, icon layer(s) 510, a capacitive sensing layer 512, and a protective layer 514. Additional light bleeding prevention layers 502, 504 are optionally provided in the display stack 500. These layers 502, 504 are provided to prevent or decrease the amount of light bleeding between adjacent layers that are both being illuminated at the same time. The light bleeding prevention layers 502, 504 can include, but are not limited to, a transparent polycarbonate material, tinted glass, polyurethane, polymethyl methacrylate (PMMA), and/or polyacetylene.

Figure 6:
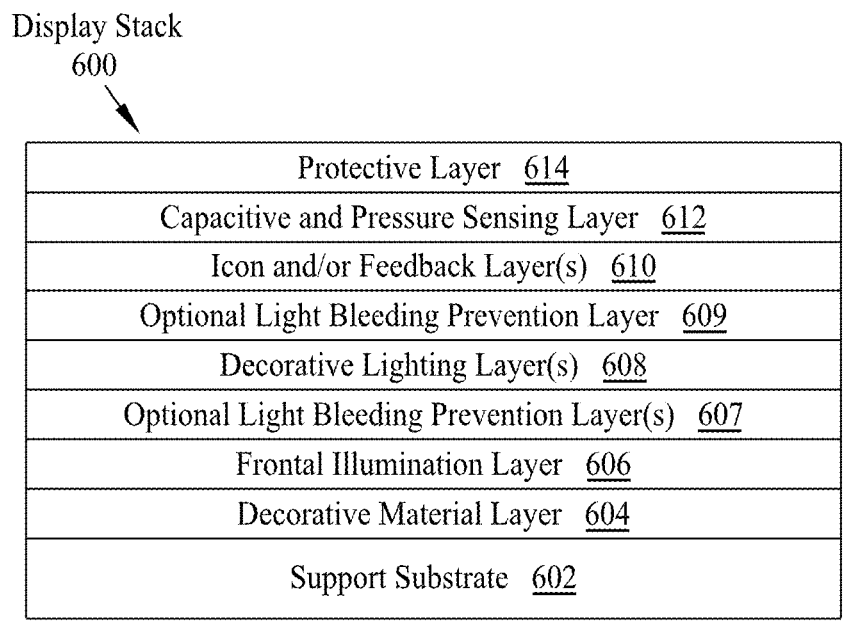

Yet another illustrative display stack 600 that can be implemented in a display of the present disclosure is shown in FIG. 6. Similar to the display stack 500, the display stack 600 comprises a support substrate 602, a decorative material layer 604, a frontal illumination layer 606, decorative lighting layer(s) 608, icon layer(s) 610, optional light bleeding prevention layer(s) 607, 609, and a protective layer 614. The capacitive sensing layer 512 has been replaced with a capacity and pressure sensing film 602. The capacity and pressure sensing film 602 can include, but is not limited to, a multi-touch and force sensing material (e.g., a material available from Cambridge Touch Technologies of Cambridge, United Kingdom). The capacity and pressure sensing film 602 eliminates the need to use pressure sensors 408, 410 for detecting how hard a person is pressing on the display. Thus, the capacity and pressure sensing film 602 can provide a display with a reduced form factor and/or complexity.

Figure 8A:
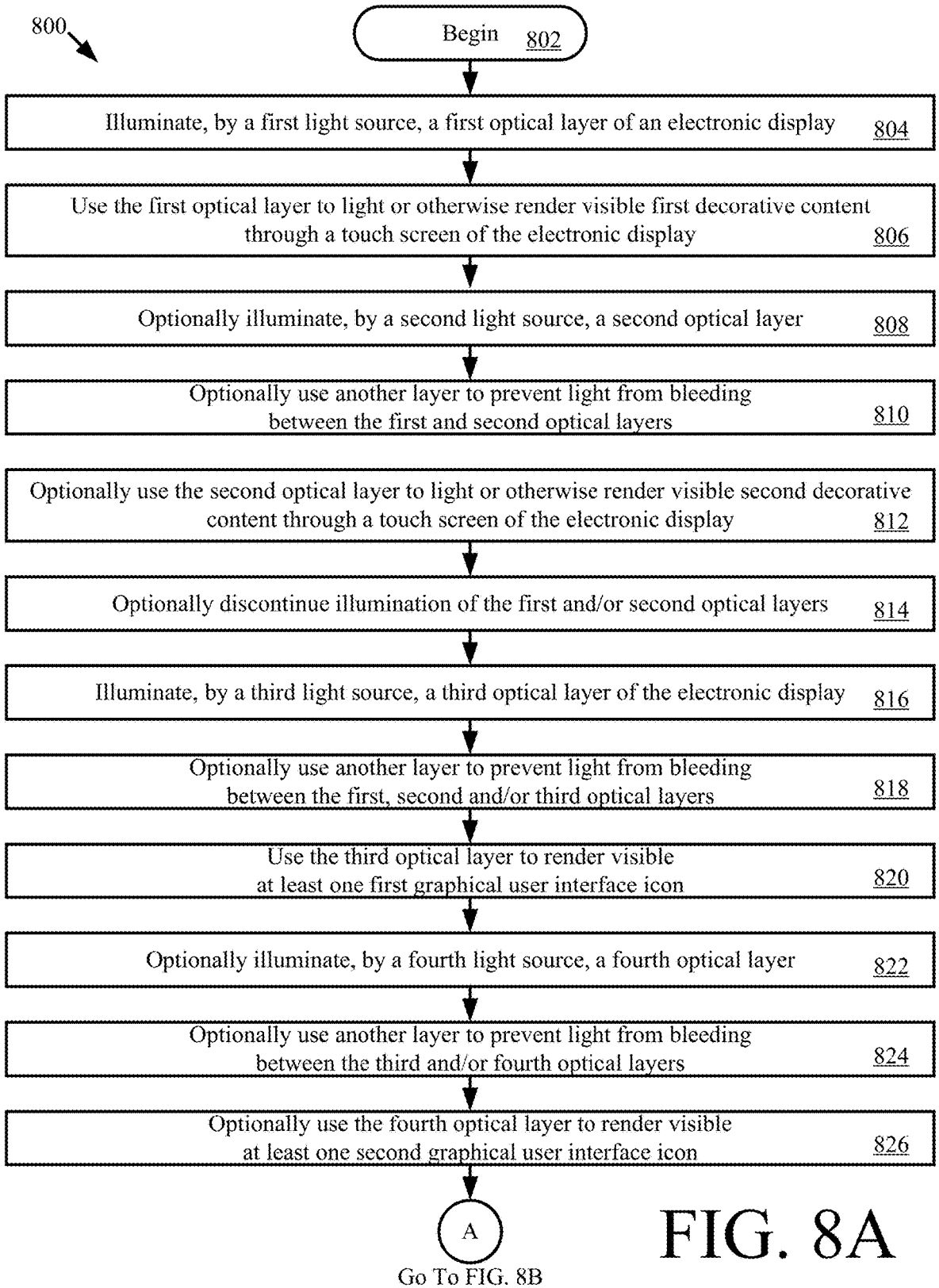
FIG. 8A and FIG. 8B (collectively referred to herein as "FIG. 8") provide an example flow diagram of an illustrative method for operating a display in accordance with some embodiments.

Referring now to FIG. 8, there is provided a flow diagram of a method 800 for operating an electronic display (e.g., the display 102 of FIG. 1 or the display 400 of FIG. 4) in accordance with the present disclosure. Method 800 begins with 802 and continues with 804 where a first light source (e.g., the light source 402 or 404 of FIG. 4) illuminates a first optical layer (e.g., the layer 202 of FIG. 2, the layer 306 of FIGS. 3-4, or the layer 308 of FIGS. 3-4) of the electronic display. In 806, the first optical layer is used to light or otherwise render visible first decorative content through a touch screen of the electronic display. The first decorative content can include, but is not limited to: a vencer panel (e.g., the panel 202 of FIG. 2, the layer 304 of FIGS. 3-4) that is located below the first optical layer in a stack of layers (e.g., the stack 200 of FIG. 2, the display stack 300 of FIG. 3, the display stack 500 of FIG. 5, or the display stack 600 of FIG. 6); or first lighting content. The first optical layer may uniformly or non-uniformly light a front surface (e.g., the surface 210 of FIG. 2) of the vencer panel.

In block 808, a second light source (e.g., the light source 404 of FIG. 4) illuminates a second optical layer (e.g., the layer 308 of FIGS. 3-4) of the electronic display. Another layer (e.g., the layer 502 of FIG. 5) may optionally be used in 810 to prevent light from bleeding between the first and second optical layers. The second optical layer is used in 812 to light or otherwise render visible second decorative content through a touch screen of the electronic display. The second decorative content can include, but is not limited to, second lighting content. The first lighting content and the second lighting content may be presented in the same color or different colors. Additionally, or alternatively, the first lighting content and the second lighting content may have different perceived depths to the user. Illumination of the first optical layer and/or second optical layer may optionally be discontinued in block 814.

Upon completing the operations of any one of blocks 806-814, the method 800 continues with touch screen operations. The touch screen operations are implemented by a third optical layer (e.g., the layer 204 of FIG. 2 or the layer 310 of FIGS. 3-4) and a touch sensing layer (e.g., the layer 206 of FIG. 2, the layer 312 of FIGS. 3-4, or the layer 602 of FIG. 6). In block 816, a third light source (e.g., the light source 406 of FIG. 4) illuminates the third optical layer (e.g., the layer 204 of FIG. 2, or the layer 310 of FIGS. 3-4). Another layer (e.g., the layer 502 and/or 504 of FIG. 5) may optionally be used in 818 to prevent light from bleeding between the first, second and/or optical layers. The third optical layer is used in 820 to render visible at least one first graphical user interface icon (e.g., icon 224 of FIG. 2) to the user of the electronic display.

In 822, a fourth light source optionally illuminates a fourth optical layer (e.g., the layer 310 of FIGS. 3-4) of the electronic device. Another layer may be used in 824 to prevent bleeding between the third and/or fourth optical layers. The fourth optical layer is used in 826 to render second graphical user icon(s) visible to the user of the electronic device. The first and second graphical user icon(s) may be presented in the same color or different colors. The first and second graphical user icon may have different perceived depths to the user. Upon completing 820 or 826, method 800 continues to 828 of FIG. 8B.

Figure 8B:
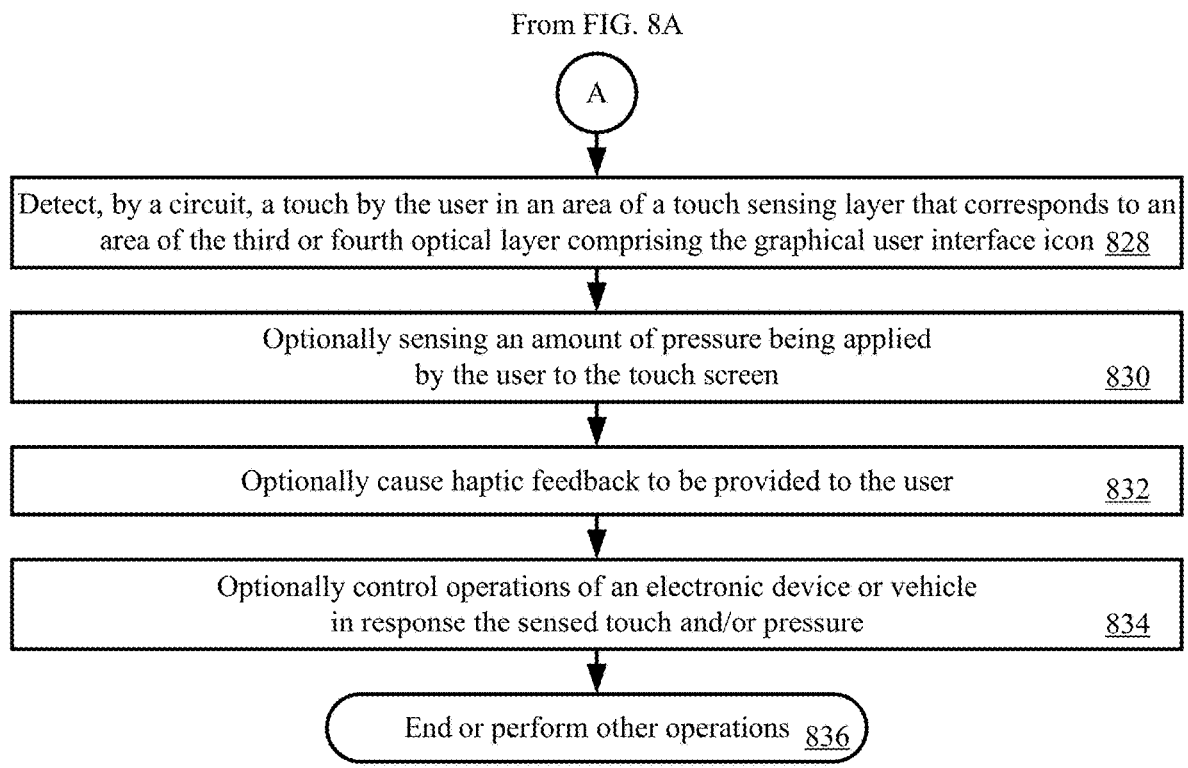

As shown in FIG. 8B, block 828 involves detecting, by a circuit (e.g., the circuit 414 of FIG. 4), a touch by the user in an area of the touch sensing layer (e.g., the layer 312 of FIGS. 3-4) that corresponds to an area of the third or fourth optical layer comprising the graphical user interface icon. In 830, the system optionally performs operations to sense an amount of pressure being applied by the user to the touch screen. The pressure can be sensed in 830 using pressure sensors (e.g., the pressure sensors 408, 410 of FIG. 4) or a capacitive and pressure sensing film (e.g., the film 602 of FIG. 6) of the touch sensing layer. Haptic feedback may optionally be provided in 832. The haptic feedback can be responsive the pressure sensing. The haptic feedback can include tactile feedback, auditory feedback, and/or visual feedback. In the visual feedback scenario, another optical layer (e.g., the layer 310 of FIGS. 3-4) could be illuminated.

In 834, operations of an electronic device and vehicle are controlled responsive to the sensed touch and/or pressure. Subsequently, operations are performed in block 836 such that method 800 ends or other operations are performed (e.g., return to 802 of FIG. 8A).

Figure 9:
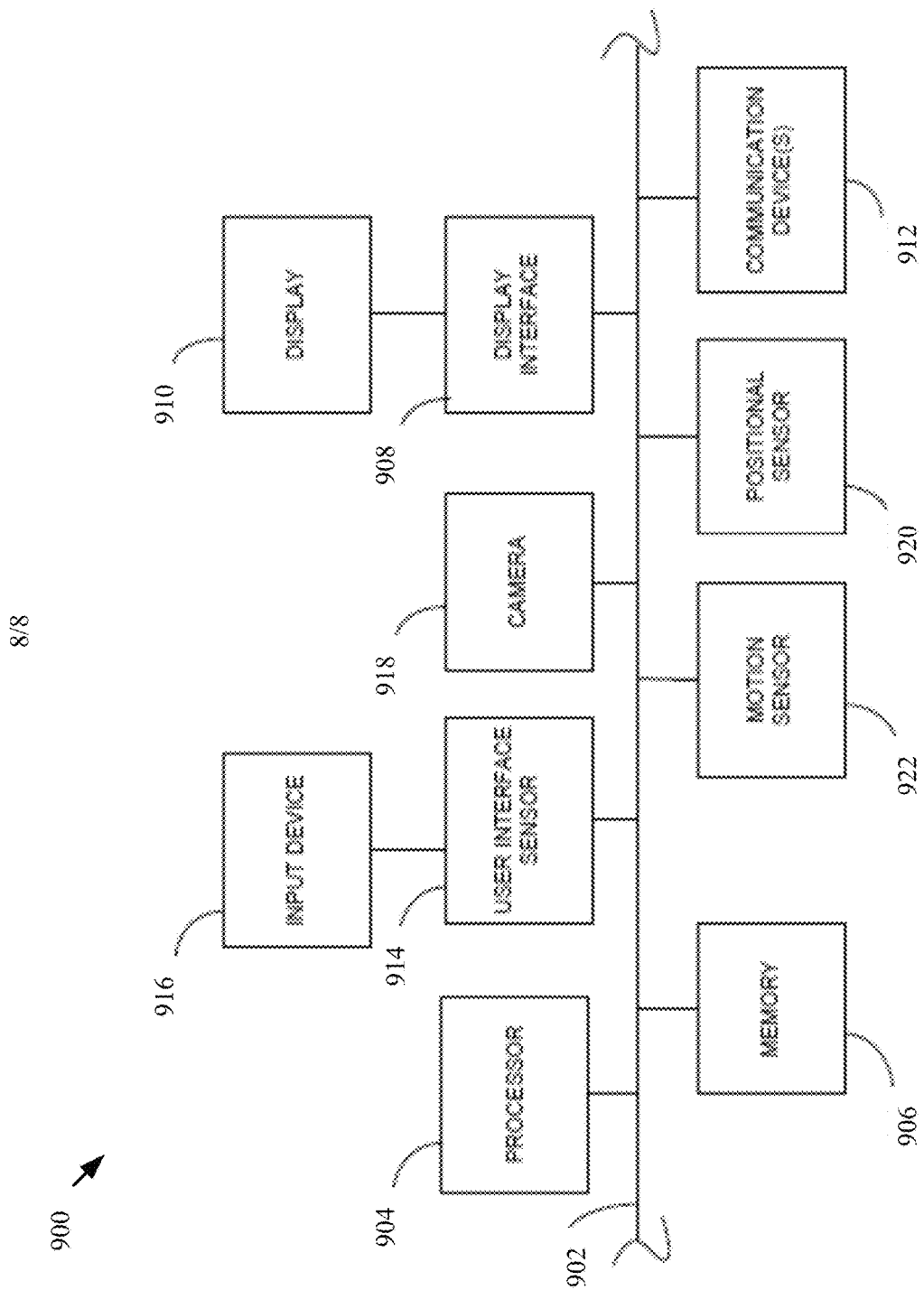
FIG. 9 provides one example of a block diagram of an illustrative architecture for an electronic device in accordance with some embodiments.

FIG. 9 provides a block diagram of an electronic device 900. The electronic device 100 can be the same as or similar to the electronic device 900. As such, the discussion of the electronic device 900 is sufficient for understanding the electronic device 100.

An electrical bus 902 serves as a communication path via which messages, instructions, data, or other information may be shared among the other illustrated components of the hardware. A processor 904 is a central processing device of the electronic device 900, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of a memory device 906. A memory device 906 may include a single device or a collection of devices across which data and/or instructions are stored.

A display interface 908 may permit information to be displayed on a display device 910 in visual, graphic or alphanumeric format. The display device 910 can include a touch screen display and can operate in accordance with known touch screen circuit technology (e.g., an electronic circuit at the four corners of the display configured to sense changes in capacitance when a human finger is in proximity or contact with the display screen, and/or inductors placed under the display screen to sense when a human finger is in proximity or contact with the display screen). An audio interface and audio output (such as a speaker) also may be provided. Haptic feedback devices may also be provided as discussed above.

Communication with external devices may occur using various communication devices 912 such as a wireless antenna, a radio frequency identification (RFID) tag and/or short-range or near-field communication transceiver, each of which may optionally communicatively connect with other components of the device via one or more communication systems. The communication devices 912 may be configured to be communicatively connected to a communications network, such as the Internet, a local area network or a cellular telephone data network.

The hardware may also include a user interface sensor 914 that allows for receipt of data from an input device 916 such as a keyboard, a mouse, a joystick, a touchscreen, a touch pad, a remote control, a pointing device, and/or microphone. Digital image frames also may be received from a camera 918 that can capture video and/or still images. The electronic device 900 also may include a positional sensor 920 and/or a motion sensor 922 to detect position and movement of the electronic device 900. Examples of motion sensors 922 include gyroscopes or accelerometers. Examples of positional sensors 920 include a global positioning system (GPS) sensor device that receives positional data from an external GPS network.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, the present solution can operate with software, hardware, and/or operating system implementations other than those described in this document.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 9.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the term "imaging device" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod or tripod. The imaging device can also be mounted on a transporting vehicle such as an aerial drone, a robotic vehicle, or on a piloted aircraft such as a plane or helicopter having a transceiver that can send captured digital images to, and receive commands from, other components of the system.

The features and functions described above, as well as alternatives, may be combined into many other different systems or applications. Various alternatives, modifications, variations or improvements may be made by those skilled in the art, each of which is also intended to be encompassed by the disclosed embodiments.

I claim:

1. A method for operating an electronic display, comprising:

illuminating, by a first light source, a first optical layer such that decorative content is lit or rendered visible to a user through a touch screen of the electronic display, wherein the touch screen comprises a second optical layer and a touch sensing layer, and wherein the decorative content comprises first lighting content;

illuminating, by a second light source, the second optical layer such that at least one first graphical user interface icon is visible to the user;

illuminating, by a third light source, a third optical layer such that second different lighting content is selectively rendered visible to the user through the touch screen of the electronic display in response to a predefined interaction;

detecting, by a circuit, a touch by the user in an area of the touch sensing layer that corresponds to an area of the second optical layer comprising the at least one first graphical user interface icon;

modifying, in response to the detection of the touch, at least one of a lighting intensity of the first optical layer or the second optical layer, a visibility of the decorative content, or an appearance of the at least one first graphical user interface icon;

controlling the illumination of the first optical layer by reducing or discontinuing illumination of the first optical layer prior to illuminating the second optical layer;

using another layer to prevent unwanted light mixing or interference and to prevent light from bleeding between the first optical layer and the second optical layer, wherein the another layer is a separation layer or a light-blocking layer; and illuminating, by a fourth light source, a fourth optical layer such that at least one second graphical user icon is visible to the user of the electronic display prior to, subsequent to, or along with visibility of the at least one first graphical user interface icon, wherein the decorative content comprises a veneer panel located below the first optical layer in a stack of layers, the veneer panel having its front surface lighted uniformly or non-uniformly by illumination of the first optical layer.

2. The method according to claim 1, wherein the first lighting content and the second different lighting content have different colors.

3. The method according to claim 1, wherein the first lighting content and the second different lighting content have different perceived depths to the user.

4. The method according to claim 1, wherein the at least one first graphical user icon and the at least one second graphical user icon have different colors.

5. The method according to claim 1, wherein the at least one first graphical user icon and the at least one second graphical user icon have different perceived depths to the user.

6. An electronic display, comprising:

a first optical layer configured to display decorative content when illuminated;

a touch screen comprising a second optical layer and a touch sensing layer;

a first light source configured to illuminate the first optical layer such that the decorative content is lit or rendered visible to a user through the touch screen;

a second light source configured to illuminate the second optical layer such that at least one first graphical user interface icon is visible to the user;

a third light source configured to illuminate a third optical layer such that second different lighting content is selectively rendered visible to the user through the touch screen of the electronic display in response to a predetermined interaction;

a circuit configured to detect a touch by the user in an area of the touch sensing layer that corresponds to an area of the second optical layer comprising the at least one first graphical user interface icon, the circuit having at least one pressure sensor configured to sense an amount of pressure being applied by the user to the touch screen;

a light-blocking layer configured to prevent light from bleeding between the first optical layer and the second optical layer;

a fourth light source configured to illuminate a fourth optical layer such that at least one second graphical user icon is visible to the user of the electronic display prior to, subsequent to, or along with visibility of the at least one first graphical user icon;

wherein the decorative content comprises a veneer panel located below the first optical layer in a stack of layers, the veneer panel having a front surface lighted uniformly or non-uniformly by illumination of the first optical layer;

wherein the circuit is configured to cause haptic feedback to be provided to the user responsive to the sensing by the at least one pressure sensor, and wherein the touch sensing layer comprises a capacitive and pressure sensing film.

7. The electronic display according to claim 6, wherein a control system is configured to modify the illumination of at least one optical layer or adjust a visibility of displayed content based on detected touch input.

8. The electronic display according to claim 6, wherein the at least one first graphical user icon and the at least one second graphical user icon have different colors.

9. The electronic display according to claim 6, wherein the at least one first graphical user icon and the at least one second graphical user icon have different perceived depths to the user.

10. A method for operating an electronic display, comprising:

illuminating, by a first light source, a first optical layer such that decorative content is lit or rendered visible to a user through a touch screen of the electronic display, wherein the touch screen comprises a second optical layer and a touch sensing layer, and wherein the decorative content comprises first lighting content;

illuminating, by a second light source, the second optical layer such that at least one first graphical user interface icon is visible to the user;

illuminating, by a third light source, a third optical layer such that second different lighting content is selectively rendered visible to the user through the touch screen of the electronic display in response to a predefined interaction; and detecting, by a circuit, a touch by the user in an area of the touch sensing layer that corresponds to an area of the second optical layer comprising the at least one first graphical user interface icon;

sensing, by at least one pressure sensor of the circuit, an amount of pressure being applied by the user to the touch screen;

causing, by the circuit, haptic feedback to be provided to the user responsive to the sensing by the at least one pressure sensor, wherein the touch sensing layer comprises a capacitive and pressure sensing film.

11. The method according to claim 10, further comprising:

causing, by the circuit, haptic feedback to be provided to the user responsive to said pressure sensed by the touch sensing layer; and controlling operations of an electronic device or a vehicle responsive to said touch.

12. The method according to claim 10, further comprising detecting, by the touch sensing layer, the amount of pressure being applied by the user to the touch screen.

* * * * *